United States Patent
Boys

(10) Patent No.: US 6,490,999 B1
(45) Date of Patent: Dec. 10, 2002

(54) COLLAR APPARATUS ENABLING SECURE HANDLING OF A SNAKE BY TETHER

(75) Inventor: Donald Robert Martin Boys, Bella Vista, CA (US)

(73) Assignee: Central Coast Patent Agency, Inc., Aromas, CA (US)

( * ) Notice: Subject to any disclaimer, the term of this patent is extended or adjusted under 35 U.S.C. 154(b) by 0 days.

(21) Appl. No.: 09/942,485

(22) Filed: Aug. 29, 2001

(51) Int. Cl.[7] .............................................. A01K 27/00
(52) U.S. Cl. ..................... 119/792; 119/654; 119/769; 119/795; 119/856; 119/864; 119/865
(58) Field of Search ................................ 119/792, 760, 119/769, 795, 815, 816, 864, 865, 714, 821, 654, 856

(56) References Cited

U.S. PATENT DOCUMENTS

| | | | | |
|---|---|---|---|---|
| 1,093,743 A | * | 4/1914 | Tegarden | 119/654 |
| 1,887,491 A | * | 11/1932 | Johnson | 119/714 |
| 4,606,484 A | * | 8/1986 | Winter et al. | 224/218 |
| 4,811,695 A | * | 3/1989 | Higgins | 119/106 |
| 4,977,860 A | * | 12/1990 | Harwell | 119/109 |
| 4,999,853 A | * | 3/1991 | Tanner | 2/321 |
| 5,005,833 A | * | 4/1991 | Groveman et al. | 273/DIG. 30 |
| 5,050,538 A | * | 9/1991 | Gurski, Jr. | 119/106 |
| 5,485,811 A | * | 1/1996 | Jacobsen et al. | 119/798 |
| 5,749,504 A | * | 5/1998 | Bieker | 224/221 |
| 5,803,017 A | * | 9/1998 | Stewart | 119/799 |
| 5,829,058 A | * | 11/1998 | Dicker et al. | 2/227 |
| 6,101,981 A | * | 8/2000 | Friend et al. | 119/860 |
| 6,156,001 A | * | 12/2000 | Frangi et al. | 602/19 |
| 6,182,293 B1 | * | 2/2001 | Mustin | 2/161.1 |
| 6,192,835 B1 | * | 2/2001 | Calhoun et al. | 119/792 |
| 6,205,956 B1 | * | 3/2001 | Dickie et al. | 119/792 |

OTHER PUBLICATIONS

Donald Robert Martin Boys, Collar Apparatus Enabling Tethering and Walking of a Snake Disclosure Doument No. 497,031, Jul. 18, 2001, USPTO.

* cited by examiner

Primary Examiner—Charles T. Jordan
Assistant Examiner—Bret Hayes
(74) Attorney, Agent, or Firm—Donald R. Boys; Central Coast Patent Agency, Inc.

(57) ABSTRACT

A collar for collaring a snake has an elongated collar section forming a physical collar when wrapped around the body portion of the snake. The collar further has a support section for supporting an attachment mechanism for accepting attachment of a tether and a connector system comprising at least two components affixed to strategic portions of the collar section for securing the collar in place around the body portion of the snake. The length of the collar section is such that a portion thereof overlaps itself when fitted around the snake providing an adjustable interface containing separate components of the connector system whereby mating the connector components together. secures the collar in place on the snake. In one embodiment the collar apparatus further includes a concertina movement-neutralization device for reducing concertina movement through the collar.

14 Claims, 5 Drawing Sheets

Perspective (Wrapped on Snake)

*Fig. 3 Perspective (Wrapped on Snake)*

COLLAR APPARATUS ENABLING SECURE HANDLING OF A SNAKE BY TETHER

FIELD OF THE INVENTION

The present invention is in the field of pet supplies and pertains more particularly to a collar apparatus for enabling tethering and subsequent walking of a pet snake away from its enclosure.

BACKGROUND OF THE INVENTION

There are many snake owners that do not spend much time handling their snakes. This is largely because they must hold them constantly while handling them for fear of losing control of them. Letting a snake go in a living room or outside can result in loss of the snake as it may slither into a crevice, hole, or other hideaway unnoticed making it difficult if not impossible to retrieve the snake.

As a result, most snakes are kept indoors year round under less than optimum lighting conditions (artificial light). It would be beneficial if snake owners could spend some outdoor time with their animals as it is known that natural sunlight and the warmth it produces is very beneficial to the epidermal health of any reptile. For example, a reptile getting more sunlight will have a better skin condition than one kept in the dark or in low light conditions.

Standard animal collars such as designed for dogs and cats as well as other legged animals are not designed for the body style of a snake because the snake has no external appendages. A snake exhibits concertina motion wherein the belly muscles of the snake act in concert to propel the snake in a forward direction. This type of forward motion is unique to a snake and is independent of any side-to-side serpentine movement. The concertina motion of a snake coupled with an ability to alter the shape of it's circumference enables it to move through and escape any known annular restraint such as a neck-style collar.

Also, because of the ability of a snake to gradually change in size (circumference) due to food conditions and normal growth, it would be extremely difficult to collar the animal with a prior-art style collar that would always fit the animal.

In prior art there are no apparatus designed for collaring a snake so that it may be casually handled giving the snake freedom to move about without being held in the physical hands on sense.

Therefore, what is clearly needed is a collar apparatus and mechanism that enables a user to collar a snake securely such that it may be tethered and allowed to move about un-hindered in any area away from the snake's enclosure.

SUMMARY OF THE INVENTION

In a preferred embodiment of the present invention, a collar apparatus is provided for collaring a snake. The collar apparatus comprises, an elongated collar section forming a physical collar when wrapped around the circumference of a strategic body portion of the snake, a support section associated with the collar section, the support section for supporting an attachment mechanism for accepting attachment of a tether and a connector system comprising at least two components affixed to strategic portions of the elongated section for securing the collar in place around the strategic body portion of the snake. The length of the collar section is such that a portion thereof overlaps itself when fitted around the snake providing an adjustable interface containing separate components of the connector system whereby mating the connector components together secures the collar in place on the snake.

In a preferred aspect, the association of the support section with the collar section of the collar apparatus comprises components of the same material formed contiguously the support section occupying one end of the elongated section. Also in a preferred aspect, the attachment mechanism for accepting attachment of the tether is a ring supported by the material of the collar apparatus. In one aspect, the support section contains an elongated opening of a length longer than the width of the collar section such that the free end of the collar section may be inserted there through.

In another aspect of the present invention, a concertina movement-neutralization device is provided for reducing concertina movement of a snake through a collar apparatus, the collar apparatus having an elongated collar section forming a physical collar when wrapped around the circumference of a strategic body portion of the snake; a support section associated with the collar section, the support section for supporting an attachment mechanism for accepting attachment of a tether; and a connector system comprising at least two components affixed to strategic portions of the elongated collar section for securing the collar in place around the strategic body portion of the snake. The concertina movement-neutralization device comprises, in a preferred aspect, a plurality of lengths of bead-chain arranged in substantially parallel rows, the beads enabled to rotate around their axis in a direction perpendicular to the longitudinal axis of the collar section of the collar apparatus, wherein concertina movement forced against the beads causes the beads to rotate about their axis' reducing forward displacement of the snake through the collar apparatus.

In one aspect, the beads are elongated. In another aspect, the beads are annular. In one embodiment, the concertina movement-neutralization device is affixed to the collar section of the collar apparatus by sewing. In another aspect, the concertina movement-neutralization device is affixed to the collar section of the collar apparatus by staples. In yet another aspect, the concertina movement-neutralization device is affixed to the collar section of the collar apparatus by plastic snap-rings.

In still another aspect of the invention, a system for enabling collaring, tethering, and walking of a snake is provided the system comprising, a collar apparatus for collaring the snake, the collar apparatus including an elongated section forming a physical collar when wrapped around the circumference of a strategic body portion of the snake, a support section associated with the collar section, the support section for supporting an attachment mechanism for accepting attachment of a tether and a connector system comprising at least two components affixed to strategic portions of the elongated section for securing the collar in place around a strategic body portion of the snake, a tether for attaching to the collar apparatus, and an elongated rod having a handle section strategically located at one end and a hook affixed to the end opposite the end supporting the handle section.

A user placing and securing the collar apparatus on a snake attaches the tether to the collared animal enabling the user to release the snake under control of the attached tether and wherein the elongated rod is used to provide an extra measure of control for retrieving the tethered snake or when changing the direction of movement of the tethered snake.

In still another aspect of the invention, a method is provided for collaring and tethering snake so that it may be released under control of the tether. The method includes the steps of (a) positioning and securing a collar apparatus around the circumference of the snake a strategic location on the snake's body, (b) attaching a tether to the collar apparatus, and (c) releasing the snake under user control via the attached tether.

In a preferred aspect in step (a), the collar apparatus comprises an elongated collar section forming a physical collar when wrapped around the circumference of a strategic body portion of the snake, a support section associated with the collar section, the support section for supporting an attachment mechanism for accepting attachment of a tether and a connector system comprising at least two components affixed to strategic portions of the elongated section for securing the collar in place around a strategic body portion of the snake.

In one aspect in step (a) the collar apparatus further comprises a concertina movement-neutralization device for reducing concertina movement of the snake through the collar apparatus.

Now for the first time, a collar apparatus and tethering system is provided for application to a snake enabling snake owners to collar, tether and safely release their snakes under control of the tether enabling the animal to move freely about without being handled in the hands-on sense and without fear of losing the animal.

BRIEF DESCRIPTION OF THE DRAWING FIGURES

DESCRIPTION OF THE PREFERRED EMBODIMENTS

Figure 1:
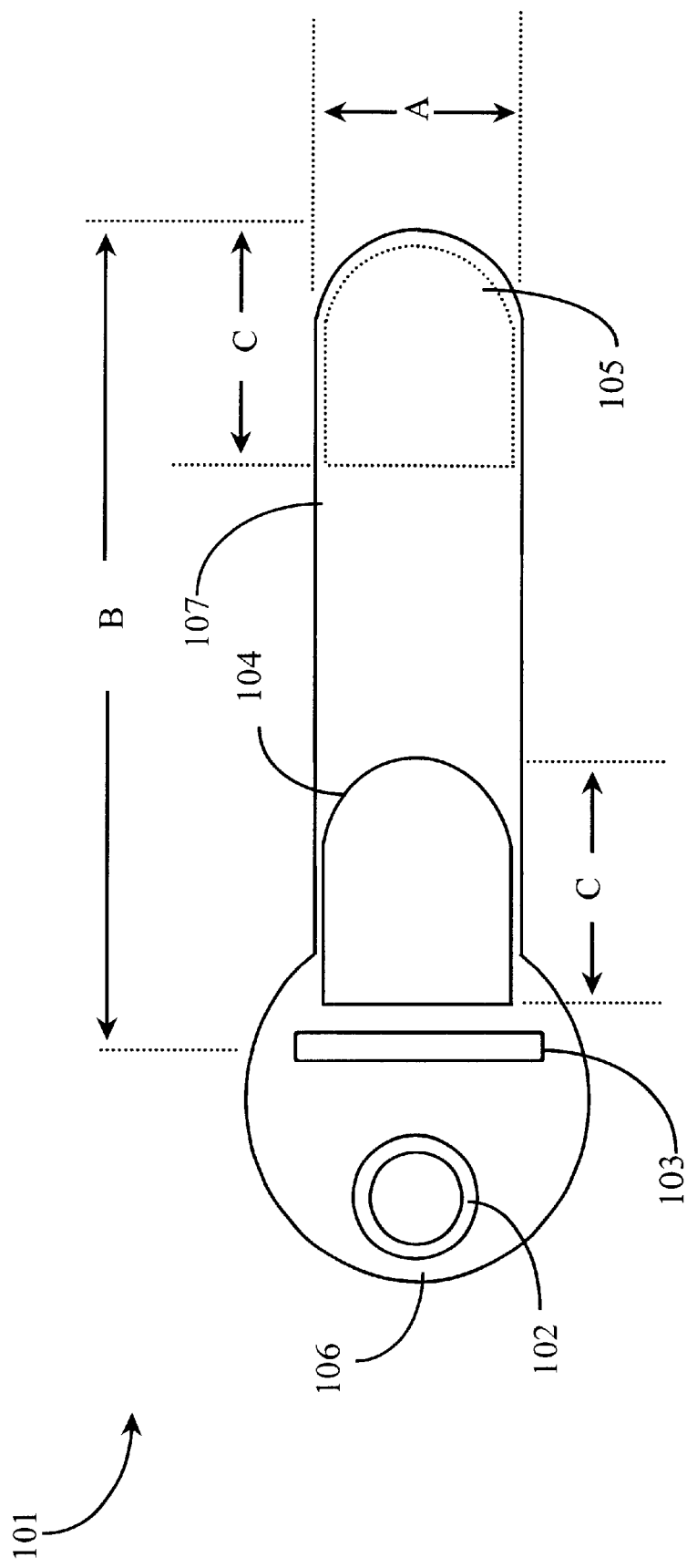
FIG. 1 is a plan view of a snake collar apparatus according to an embodiment of the present invention.

FIG. 1 is a plan view of a snake collar apparatus 101 according to an embodiment of the present invention. In a simplest embodiment, snake collar 101 is shaped of the form of a key having 2 architectural features provided in a contiguous fashion (of a same material). These are an annular support-section 106, and a collar-section 107. The key-shape design is a functional aspect of collar 101 in that it provided for a light-weight and flexible collar having a sufficient support means for a tether wherein no metallic parts touch a snake when collard.

Collar 101 is, in a preferred embodiment, fabricated of an industrial canvas fabric as is so labeled. In another embodiment, collar 101 may be fabricated of denim, leather, nylon, flexible polymer, or any other durable and flexible material. The manufactured size of collar 101 is somewhat contingent upon a target size of a snake but is adjustable to fit a range of circumferences. Dimension B is of a length to allow for a circumference of a snake's body just behind the head plus a length of overlap for securing collar 101 to itself. To this end, a section of Velcro or hook and loop fastener Lock 105 is provided for removable attachment to a like section of Velcro or hook and loop fastener material 104. An opening 103 is provided in support section 106 of collar 101 and is adapted to receive the end portion of collar section 107 there through in such a manner as to allow for Velcro or hook and loop fastener components 105 and 104 to be firmly pressed on to one another to form a secured loop of the collar apparatus.

A dimension C, illustrated herein as a length dimension applicable to both Velcro components is of such a length to allow for a certain size range of circumference dimension achieved when forming the collar around a particular snake. Therefore, a range of fit exists in collar 101 when applied to a snake. A dimension A, illustrated herein as a width dimension of collar section 107 is of such a width to allow for convenient insertion of the free end of section 107 through opening 103 provided in support section 106. In this example, dimension A is also of a determined size to minimize the area of contact between the snake and the collar. For a medium to large snake 0.75 to 1.0 inches width is deemed preferable. For a smaller snake 0.75 to 0.5 is deemed preferable.

In other embodiments, dimension A may be larger or smaller than the above dimensions cited in this example. Through empirical testing, the inventor has found that the preferred dimensions provide a comfortable fit (not irritating the snake) while minimizing concertina movement of a snake through collar 101 when in place. Moreover, the preferred dimensions prevent a snake from achieving a break or otherwise compromising the secured Velcro or hook and loop fastener connection when the collar is in place.

In a preferred embodiment, Velcro or hook and loop fastener components 105 and 104 are sewn into their illustrated positions on collar 101. In this example, Velcro or hook and loop fastener material 104 is face-up in this view while Velcro or hook and loop fastener lock 105 is sewn on the opposite side of collar section 107. In one embodiment, Velcro lock 105 and Velcro or hook and loop fastener material 104 are glued to collar 101, rather than sewn. In still another embodiment, mated plastic connectors that are secured by pressing them together may be used in place of a Velcro or hook and loop fastener connection. For very large and powerful snakes such as large pythons or Boas snaps may be used in place of or in addition to the Velcro or hook and loop fastener fastening method. The goal is to provide a secure and comfortable connection that may be adjusted to fit different circumferences.

Support section 106 of collar 101 has a grommet ring 102 pressed therein and adapted as a location for attaching a tether (not shown) thereto via a snap-ring mechanism or other known mechanism such as is common to animal tethers or leashes. Ring 102 in a preferred example is a grommet pressed into the fabric as illustrated. Ring 102 may be of a metallic, plastic, or other durable material. In another embodiment, ring 102 is simply an annular opening cut out of the canvass material and then reinforced by stitching around the periphery. In still another embodiment a ring may be provided that is capable of being separated at one portion similar to a key ring. In this case, the ring would be separated and inserted through a small opening in the canvass adapted for the purpose. There are many possibilities. When collar 101 is in place, ring 102 is separated from a snakes body and does not touch the animal.

In a preferred embodiment, support section 106 and collar section 107 are formed of the same piece of material in contiguous fashion. However, in an alternate embodiment support section 106 may be provided as a separate piece from collar section 107. In this embodiment the two sections may be sewn together or removably affixed together such as by snapping, hooking, or other methods.

One with skill in the art of fabric design will appreciate the significance of the key-shape implementation of this example. One benefit is that there are no square edges or sharp corners to contend with while walking a snake. Another benefit is that support section 106 supports grommet 102 a distance away from the body of a snake when collar 101 is in place eliminating any agitation that might occur due to intimate contact between a snake and hard parts of collar 101. The overall design is efficient and produces minimum concern for the collard animal.

Through empirical testing, the inventor has determined that concertina movement ability of a snake through collar 101 as designed is limited to 1 to 1.5 inch displacement (from behind the head toward the tail) for a large snake of 5 to 6 feet in length. At the end of the displacement, collar 101 achieves a fit that is not tight enough to agitate the collard animal, but tight enough neutralize any further concertina travel through the collar. At this position, a collard snake is also unable to compromise the above-described Velcro or hook and loop fastener connection. Moreover, the scaled design of all snakes prevents them from backing out of collar 101. After repeated collaring, it is found through testing that most snakes learn not to attempt concertina movement through the collar of the present invention.

Figure 2:
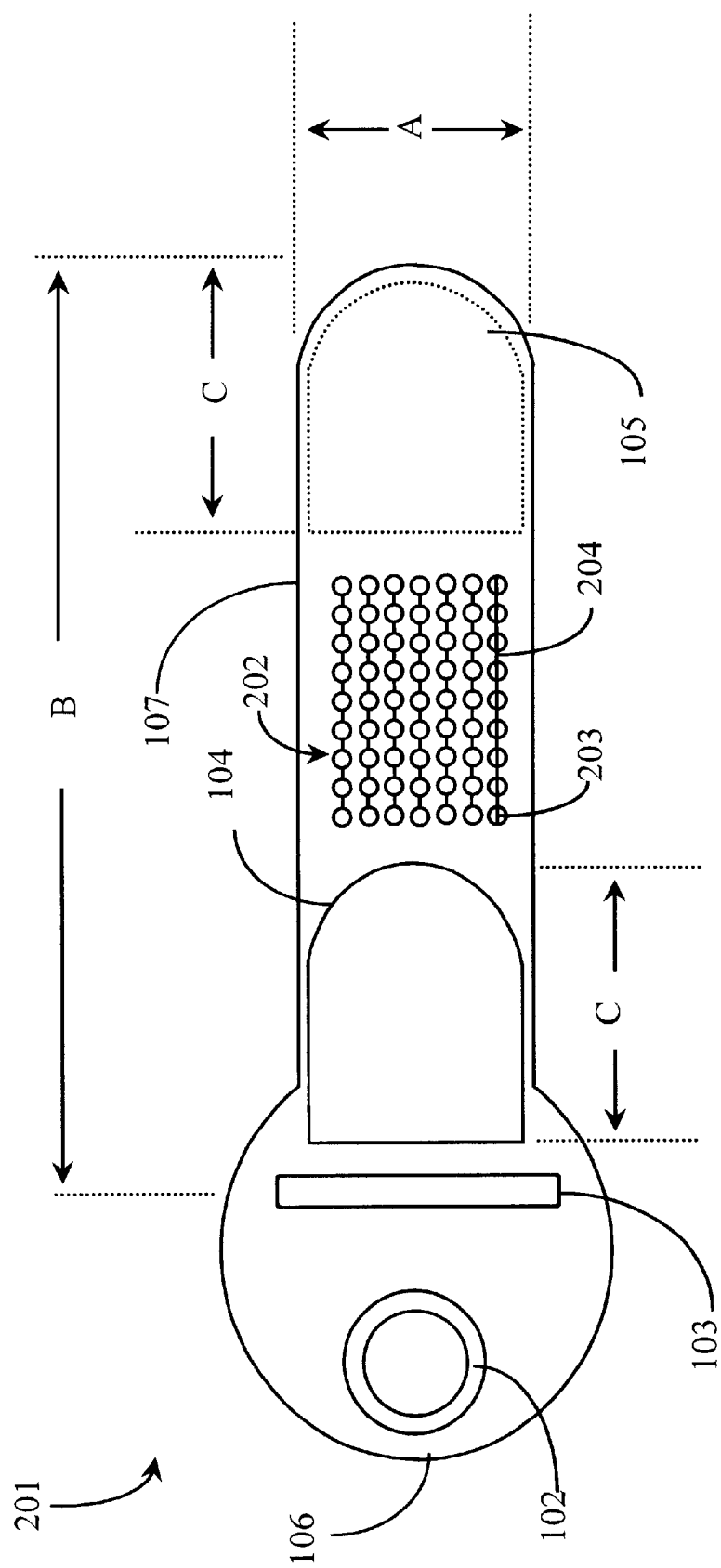
FIG. 2 is a plan view of the snake collar apparatus of FIG. 1 with a concertina neutralizing mechanism according to another embodiment of the present invention.

FIG. 2 is a plan view of the snake collar apparatus of FIG. 1 with a concertina neutralizing mechanism 202 affixed thereto according to another embodiment of the present invention. Collar 201 is an enhanced version of collar 101 as described in FIG. 1. Mechanism 202 is an enhancement that comprises an array of substantially parallel rows 204 of chained beads 203 strategically placed on and affixed to collar section 106 for the purpose of neutralizing any concertina motion through collar 201 when it is in place on an animal. Elements of this example that are also illustrated with regard to the example of FIG. 1 and that are not modified by mechanism 202 shall retain their same element numbers and shall not be reintroduced.

In a preferred embodiment of the present invention, beads 203 are metal beads that are enabled to rotate axially around their confining chain sections. Bead rows 204 are prepared to a determined length that depends on the overall size parameters of the collar that they will be affixed to and arranged in a parallel fashion such that the direction of rotation of each bead in each row is the same. Thus the direction of rotation of beads 203 is perpendicular to the longitudinal axis of collar 201. Mechanism 202 may be prepared from traditional bead-chain available in most hardware stores for chaining bathroom fixtures. There exist a variety of sizes for different applications.

Each bead row 204 comprises individual beads 203 attached together by individual wire links. In this example, there are 7 bead-rows 204 provided to for mechanism 202, however there may be more or fewer rows without departing from the spirit and scope of the invention. Similarly there may be more or fewer individual beads in each row 204 than is illustrated herein without departing from the spirit and scope of the invention.

Mechanism 202 on collar 201 serves as a concertina movement neutralization device that effectively stops any concertina movement through collar 201 and therefore any displacement of the collar from an original positioning. Collar 201, enhanced for concertina neutralization is especially useful on larger snakes and species that naturally have a higher concertina movement capability than other species. For example, Pythons and Boas have better concertina movement control than to species of Pine snake. Collar 201 is designed for larger snakes of 6 to 8 feet or more in length. However, mechanism 202 may be provided on collars that are designed for medium snakes as well without departing from the spirit and scope of the present invention. The specified size of beads 203 and the length and number of bead-rows 204 depend on size parameters of collar 201.

When collar 201 is placed and secured around a snake, mechanism 202 has a position that substantially covers the belly portion of the snake. This is where muscles in the snake produce concertina movement by undulating in a direction toward the tail of the snake. When the snake attempts to move through collar 201, beads 203 along the belly of the snake rotate about their axis neutralizing any forward motion through the collar. Although a certain amount of concertina movement through the collar of the present invention is acceptable, for larger animals, mechanism 202 provides an effective device for eliminating or substantially reducing such movement.

Figure 3:
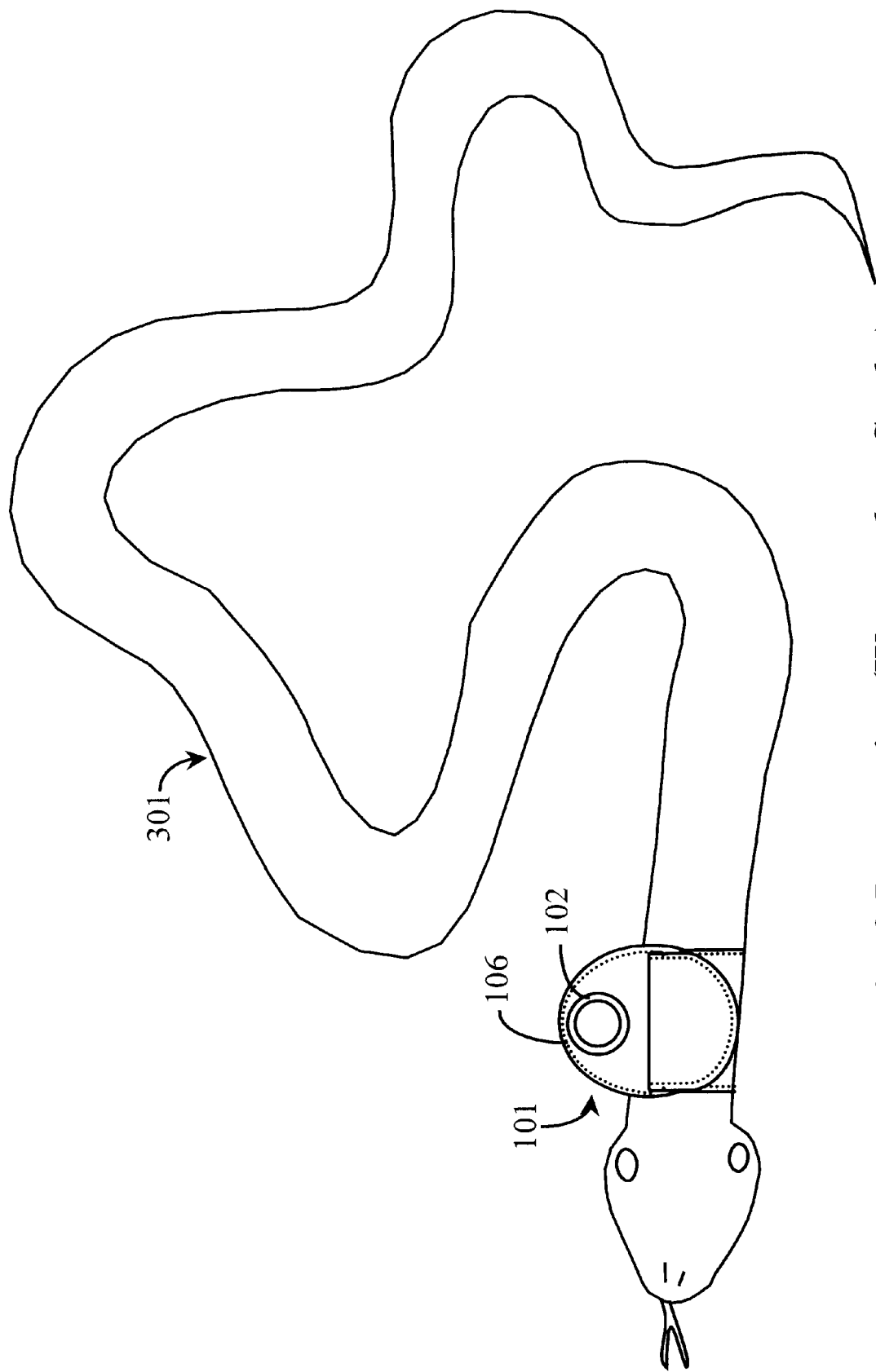
FIG. 3 is a use diagram illustrating the collar of FIG. 1 fitted on snake according to an embodiment of the present invention.

FIG. 3 is an overhead-view illustrating collar 101 of FIG. 1 placed in position on a snake 301 according to an embodiment of the present invention. A user (not shown) physically places collar 101 in position on snake 301 by physically positioning and wrapping the collar around the neck area of snake 301, inserting the free end of the collar section through the opening provided in the support section and securing the Velcro or hook and loop fastener connection. Once collar 101 is secured in position on snake 301, a leash or tether (not shown) is then attached to grommet 102 provided in support section 106. Once the tether is attached, a user may release snake 301 safely. In one embodiment, collar 101 may be positioned onto snake 301 with a tether already attached to grommet 102.

Figure 4:
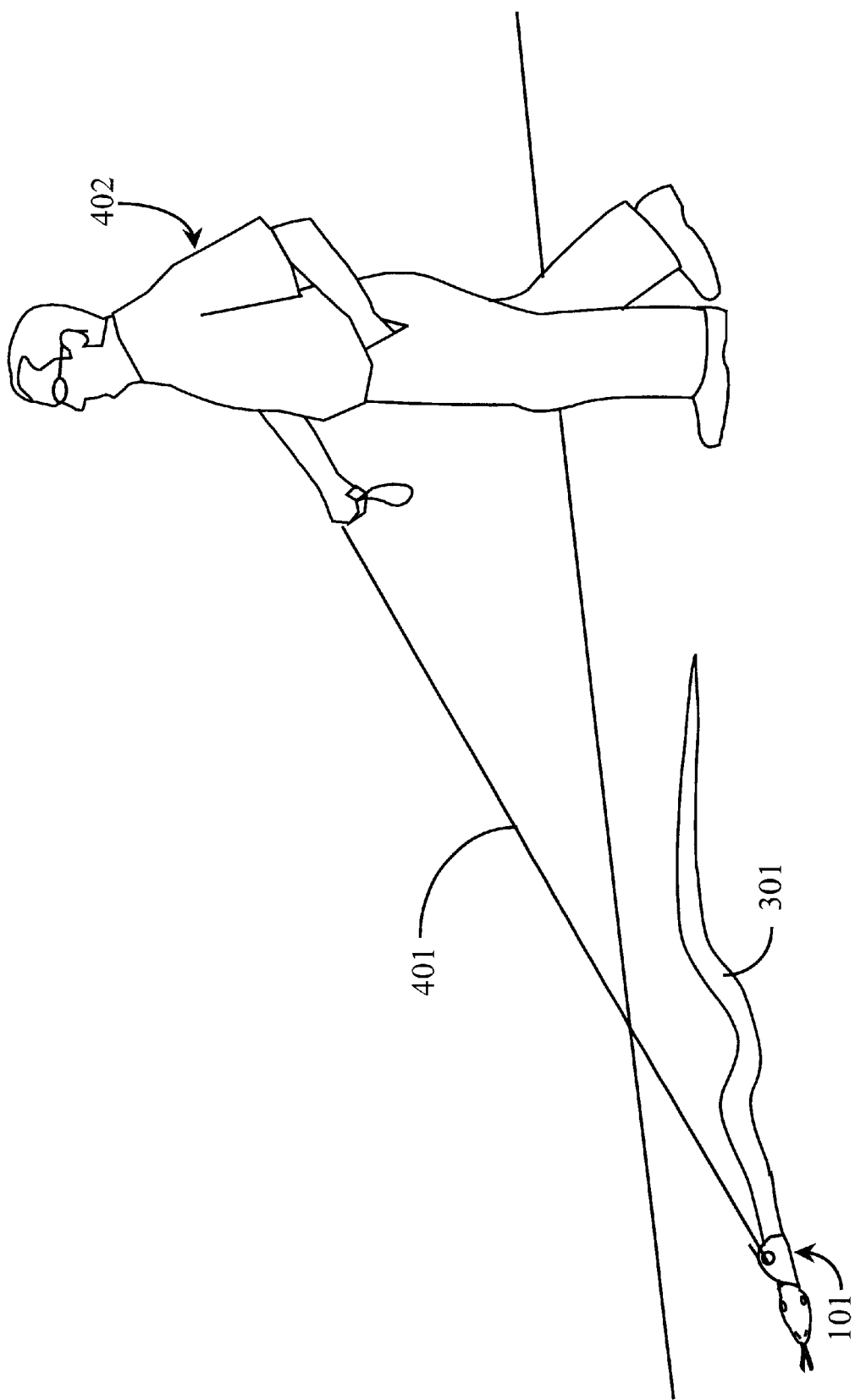
FIG. 4 is a use diagram illustrating the collar apparatus and snake of FIG. 3 in a tethered state under control of a user according to an embodiment of the present invention.

FIG. 4 is a use-diagram illustrating a user 402 walking behind and in control of snake 301 of FIG. 3 with collar 101 of FIG. 3 secured thereto with a tether 401 attached according to an embodiment of the present invention.

Once collar 101 has been positioned and secured on snake 301, tether 401 is attached as was described with reference to FIG. 3 above. Snake 301 may then be released to roam about under tethered control of user 402. Unlike other tethered animals, snake 301 will generally move in any direction it so desires and the proper position of user 402 is behind snake 301. In a preferred embodiment, tether 401 is made of a simple and light nylon cord and has a lightweight snap hardware for attaching to collar 101. In other embodiments tether 401 is made of braided rope or metallic chain or any other suitable material. It is preferred that any tether used be lightweight so as not to contribute any sense of restriction to snake 301 when collared. Although not shown in this example, an accessory comprising a stick with a hook at one end and a handle at the other end may be provided for quickly retrieving snake 301 or for changing its direction without user 402 being required to bend over to physically lift the animal with his or her hands. Such an apparatus will be briefly detailed below.

Figure 5:
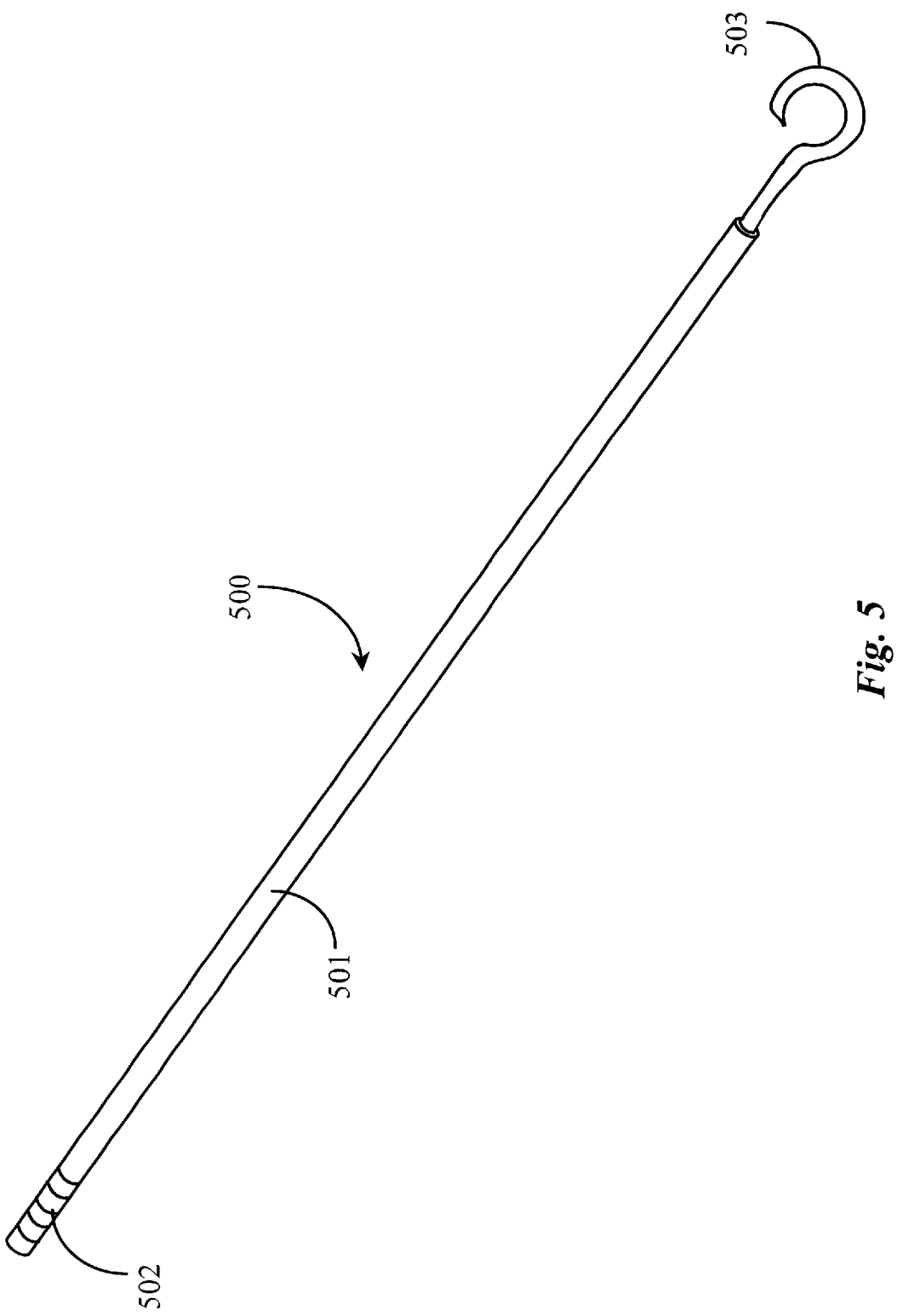
FIG. 5 is a plan view of an optional snake-retrieval stick according to an embodiment of the present invention.

FIG. 5 is a diagram of a snake stick 500 that may be used while walking a snake according to embodiments of the present invention. Stick 500, more properly termed a snake walking stick comprises an elongated rod 501, a hooked apparatus 503, and a handle section 502. In a preferred embodiment rod 501 is made of wood however in other embodiments, the rod 501 may be manufactured of any suitable material, including a metallic or plastic material.

Hooked apparatus 503 is rigidly affixed to one end of rod 501. Apparatus 503 is hooked to an extent that a user may, while standing erect, insert the hook portion of apparatus 503 through a ring or grommet provided on the collar of the present invention for the purpose of exerting an extra measure of control over a tethered and collared animal. Hook 503 is preferably threaded at one end so that it may be screwed into the interface end of rod 501. In other embodiments hook 503 may be of the same material as rod 501 such as a case of plastic wherein the hook portion may be a molded part thereof.

Handle section 502 may be of rubber or other cover material that may be glued or pressed onto rod 501 to form a comfortable handle. Handle 502 in one embodiment simply consists of groves cut into the wood or even tape material wrapped onto stick 500.

Stick 500 when used according to embodiments of the present invention is useful for enabling quick retrieval of a snake in the event that some other curious and un-tethered animal such as a cat or dog happens upon a snake-walking session. It is also useful for changing the direction of a snake by hooking the ring or grommet on the support section of the collar and lifting the animal using the leverage of the stick while supporting the posterior of the animal with the opposite hand.

In a preferred embodiment, the collar of the present invention is provided with a suitable tether and snake stick as a snake walker kit available in local pet stores.

One with skill in the art of collaring and tethering techniques for legged animals will appreciate the functional difficulties of applying known tethering techniques to snakes and that further innovation and engineering is required as was taught herein in this specification to enable successful practice of collaring and tethering of any species of snake for recreational walking of the animal.

While the present invention has been described with reference to above illustrative embodiments, those skilled in the art will appreciate that various changes in form and detail may be made without departing from the intended scope of the present invention. For example, mechanism 202 described with reference to FIG. 2 may have beads 203 that are elongated beads rather than annular beads. Velcro or hook and loop fastener connections may be replaced with other known fastening mechanisms such as an array of snaps or male/female plastic connectors.

The method and apparatus of the present invention should be afforded the broadest scope under examination especially in light of its non-obvious nature concerning application to snakes, which having no legs, are not considered in the art as tether able animals. The spirit and scope of the present invention is limited only by the claims that follow.

What is claimed is:

1. A collar apparatus for collaring a snake comprising:
   an elongated collar section forming a physical collar when wrapped around the circumference of a strategic body portion of the snake;
   a support section associated with the collar section, the support section for supporting an attachment mechanism for accepting attachment of a tether; and
   a connector system comprising at least two components affixed to strategic portions of the elongated section for securing the collar in place around the strategic body portion of the snake;
   characterized in that the length of the collar section is such that a portion thereof overlaps itself when fitted around the snake providing an adjustable interface containing separate components of the connector system whereby mating the connector components together secures the collar in place on the snake and wherein the key-shape design of the collar provides a light-weight and flexible collar wherein no metallic parts touch a snake when collared.

2. The collar apparatus of claim 1 wherein the association of the support section with the collar section comprises components of the same material formed contiguously the support section occupying one end of the elongated section.

3. The collar apparatus of claim 1 wherein the attachment mechanism for accepting attachment of the tether is a ring supported by the material of the collar apparatus.

4. The collar apparatus of claim 1 wherein the support section contains an elongated opening of a length longer than the width of the collar section such that the free end of the collar section may be inserted there through.

5. A concertina movement-neutralization device for reducing concertina movement of a snake through a collar apparatus, the collar apparatus having an elongated collar section forming a physical collar when wrapped around the circumference of a strategic body portion of the snake; a support section associated with the collar section, the support section for supporting an attachment mechanism for accepting attachment of a tether; and a connector system comprising at least two components affixed to strategic portions of the elongated collar section for securing the collar in place around the strategic body portion of the snake comprising:
   a plurality of lengths of bead-chain arranged in substantially parallel rows, the beads enabled to rotate around their axis in a direction perpendicular to the longitudinal axis of the collar section of the collar apparatus, wherein concertina movement forced against the beads causes the beads to rotate about their axes reducing forward displacement of the snake through the collar apparatus.

6. The concertina movement-neutralization device of claim 5 wherein the beads are elongated.

7. The concertina movement-neutralization device of claim 5 wherein the beads are annular.

8. The concertina movement-neutralization device of claim 5 affixed to the collar section of the collar apparatus by sewing.

9. The concertina movement-neutralization device of claim 5 affixed to the collar section of the collar apparatus by staples.

10. The concertina movement-neutralization device of claim 5 affixed to the collar section of the collar apparatus by plastic snap-rings.

11. A system for enabling collaring, tethering, and walking of a snake comprising:
   a collar apparatus for collaring the snake, the collar apparatus including an elongated section forming a physical collar when wrapped around the circumference of a strategic body portion of the snake, a support section associated with the collar section, the support section for supporting an attachment mechanism for accepting attachment of a tether and a connector system comprising at least two components affixed to strategic portions of the elongated section for securing the collar in place around a strategic body portion of the snake and wherein the key-shape design of the collar provides a light-weight and flexible collar wherein no metallic parts touch a snake when collared;

a tether for attaching to the collar apparatus; and an elongated rod having a handle section strategically located at one end and a hook affixed to the end opposite the end supporting the handle section;

characterized in that a user placing and securing the collar apparatus on a snake attaches the tether to the collared animal enabling the user to release the snake under control of the attached tether and wherein the elongated rod is used to provide an extra measure of control for retrieving the tethered snake or when changing the direction of movement of the tethered snake.

12. A method for collaring and tethering snake so that it may be released under control of the tether the method comprising steps of:

(a) positioning and securing a collar apparatus around the circumference of the snake a strategic location on the snake's body;

(b) attaching a tether to the collar apparatus; and (c) releasing the snake under user control via the attached tether.

13. The method of claim 12 wherein in step (a) the collar apparatus comprises an elongated section forming a physical collar when wrapped around the circumference of a strategic body portion of the snake, a support section associated with the collar section, the support section for supporting an attachment mechanism for accepting attachment of a tether and a connector system comprising at least two components affixed to strategic portions of the elongated section for securing the collar in place around a strategic body portion of the snake.

14. The method of claim 12 wherein in step (a) the collar apparatus further comprises a concertina movement-neutralization device for reducing concertina movement of the snake through the collar apparatus.

* * * * *